(12) United States Patent
Milette et al.

(10) Patent No.: US 8,376,631 B2
(45) Date of Patent: Feb. 19, 2013

(54) SLIDE ACTUATED FIELD INSTALLABLE FIBER OPTIC CONNECTOR

(75) Inventors: Luc Milette, Montreal (CA); Moise Levy, Laval (CA); Yannick Demers, St-Jean-sur-Richelieu (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 362 days.

(21) Appl. No.: 12/543,956

(22) Filed: Aug. 19, 2009

(65) Prior Publication Data

US 2010/0046892 A1 Feb. 25, 2010

Related U.S. Application Data

(60) Provisional application No. 61/090,089, filed on Aug. 19, 2008.

(51) Int. Cl.
G02B 6/36 (2006.01)
G02B 6/38 (2006.01)

(52) U.S. Cl. ............................................ 385/81; 385/62

(58) Field of Classification Search ............... 385/62, 385/81
See application file for complete search history.

(56) References Cited

U.S. PATENT DOCUMENTS

| | | | |
|---|---|---|---|
| 4,146,301 A | 3/1979 | Cherin | |
| 4,634,216 A * | 1/1987 | Calevo et al. | 385/65 |
| 4,669,820 A | 6/1987 | Ten Berge | |
| 4,824,197 A | 4/1989 | Patterson | |
| 4,890,896 A * | 1/1990 | Meis | 385/55 |
| 4,923,274 A | 5/1990 | Dean | |
| 4,973,126 A | 11/1990 | Degani | |
| 5,040,867 A | 8/1991 | de Jong | |
| 5,102,212 A | 4/1992 | Patterson | |
| 5,138,681 A | 8/1992 | Larson | |
| 5,159,653 A | 10/1992 | Carpenter | |
| 5,159,655 A | 10/1992 | Ziebol | |
| 5,179,608 A | 1/1993 | Ziebol | |
| 5,189,717 A | 2/1993 | Larson | |
| 5,381,500 A | 1/1995 | Edwards | |
| 5,394,496 A | 2/1995 | Caldwell | |
| 5,440,657 A | 8/1995 | Essert | |
| 5,732,174 A * | 3/1998 | Carpenter et al. | 385/72 |
| 5,963,699 A | 10/1999 | Tanaka | |
| 5,984,532 A | 11/1999 | Tamaki | |
| 6,022,150 A | 2/2000 | Erdman | |
| 6,179,482 B1 | 1/2001 | Takizawa | |
| 6,234,685 B1 | 5/2001 | Carlisle | |
| 6,471,414 B2 * | 10/2002 | Carberry et al. | 385/53 |
| 6,471,541 B2 * | 10/2002 | Kunishi et al. | 439/495 |
| 6,604,867 B2 | 8/2003 | Radek | |
| 6,773,167 B2 | 8/2004 | Scanzillo | |
| 6,781,112 B1 * | 8/2004 | Fei et al. | 250/227.11 |
| 7,003,208 B2 * | 2/2006 | Yamaguchi et al. | 385/134 |
| 7,011,454 B2 | 3/2006 | Caveney | |
| 7,014,372 B2 | 3/2006 | Watte | |
| 7,066,656 B2 | 6/2006 | Demissy | |
| 7,104,702 B2 | 9/2006 | Barnes | |
| 7,121,731 B2 | 10/2006 | Weynant | |

(Continued)

FOREIGN PATENT DOCUMENTS

WO 2008051030 5/2008

*Primary Examiner* — Charlie Peng
(74) *Attorney, Agent, or Firm* — Goudreau Gage Dubuc; Hugh Mansfield

(57) ABSTRACT

A connector assembly for reversibly terminating a fiber optic cable comprising an optical fiber stub and an actuator illustratively configured for sliding along a path between a first position and a second position which illustratively serves to move one or more anvils thereby mechanically clamping the fiber optic cable proximate to the optical fiber stub.

11 Claims, 19 Drawing Sheets

U.S. PATENT DOCUMENTS

| | | |
|---|---|---|
| 7,178,990 B2 | 2/2007 | Caveney |
| 7,194,179 B1 * | 3/2007 | Bryant et al. ............... 385/134 |
| 7,195,400 B2 | 3/2007 | Asano |
| 7,204,644 B2 | 4/2007 | Barnes et al. |
| 7,241,056 B1 | 7/2007 | Kuffel |
| 7,258,496 B2 | 8/2007 | Saito |
| 7,264,410 B1 | 9/2007 | Doss |
| 7,270,487 B2 | 9/2007 | Billman |
| 7,280,733 B2 | 10/2007 | Larson |
| 7,297,020 B2 * | 11/2007 | Takahira ................ 439/495 |
| 7,331,719 B2 * | 2/2008 | Manning et al. ............ 385/81 |
| 7,346,255 B2 | 3/2008 | Yamaguchi |
| 7,346,256 B2 | 3/2008 | Marrs |
| 7,347,627 B2 | 3/2008 | Saito |
| 7,369,738 B2 | 5/2008 | Larson |
| 7,775,726 B2 * | 8/2010 | Pepin et al. ................ 385/78 |
| 2003/0086657 A1 * | 5/2003 | Viklund ..................... 385/55 |
| 2005/0063645 A1 | 3/2005 | Carpenter |
| 2005/0105871 A1 | 5/2005 | Staupendahl |
| 2005/0238292 A1 | 10/2005 | Barnes |
| 2006/0002662 A1 | 1/2006 | Manning |
| 2006/0153515 A1 | 7/2006 | Honma |
| 2007/0047883 A1 | 3/2007 | Watte |
| 2007/0104425 A1 * | 5/2007 | Larson et al. ............... 385/86 |
| 2007/0127872 A1 | 6/2007 | Caveney |
| 2007/0172179 A1 | 7/2007 | Billman |
| 2007/0196054 A1 | 8/2007 | Palmer |
| 2007/0286554 A1 | 12/2007 | Kuffel |
| 2007/0286563 A1 | 12/2007 | Wagner |
| 2007/0297746 A1 | 12/2007 | Carpenter |
| 2008/0013891 A1 | 1/2008 | Nishioka |
| 2008/0019646 A1 | 1/2008 | deJong |
| 2008/0044137 A1 | 2/2008 | Luther |
| 2008/0044144 A1 | 2/2008 | Doss et al. |
| 2008/0118205 A1 | 5/2008 | Furuyama |
| 2008/0118206 A1 | 5/2008 | Wagner |
| 2008/0175541 A1 | 7/2008 | Lu |
| 2009/0269986 A1 * | 10/2009 | Satoh et al. ............... 439/630 |
| 2010/0098381 A1 * | 4/2010 | Larson et al. ............... 385/60 |

* cited by examiner

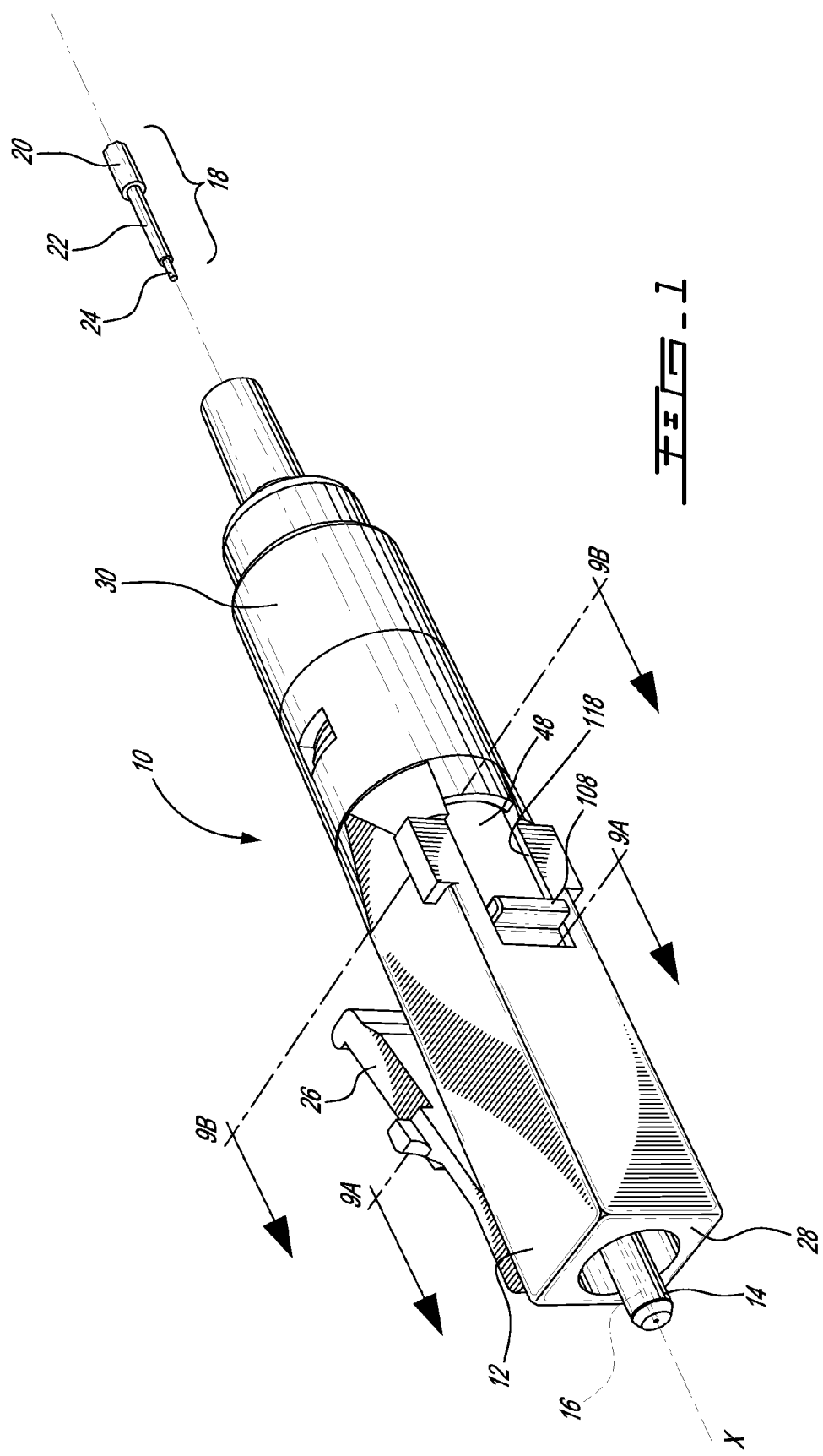

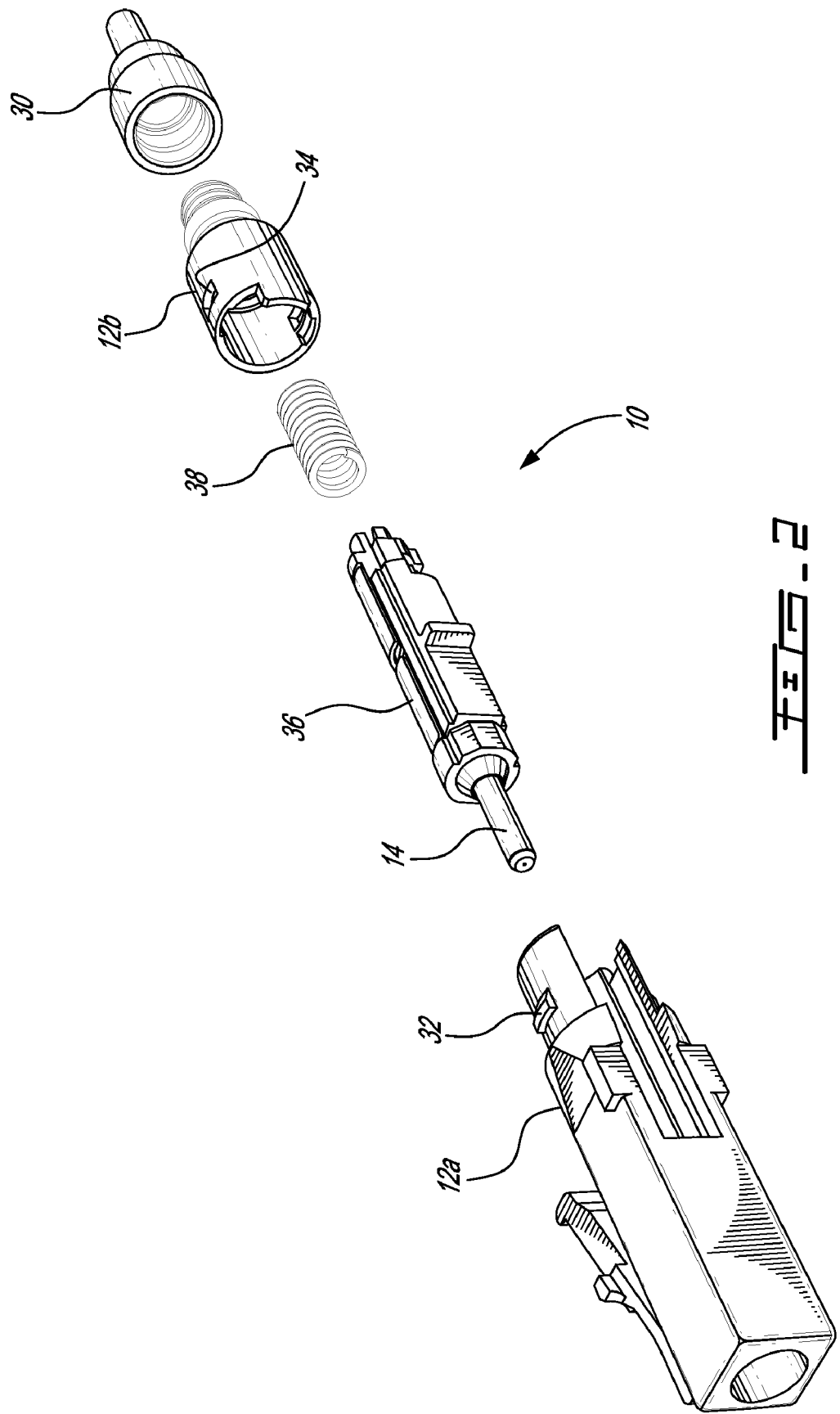

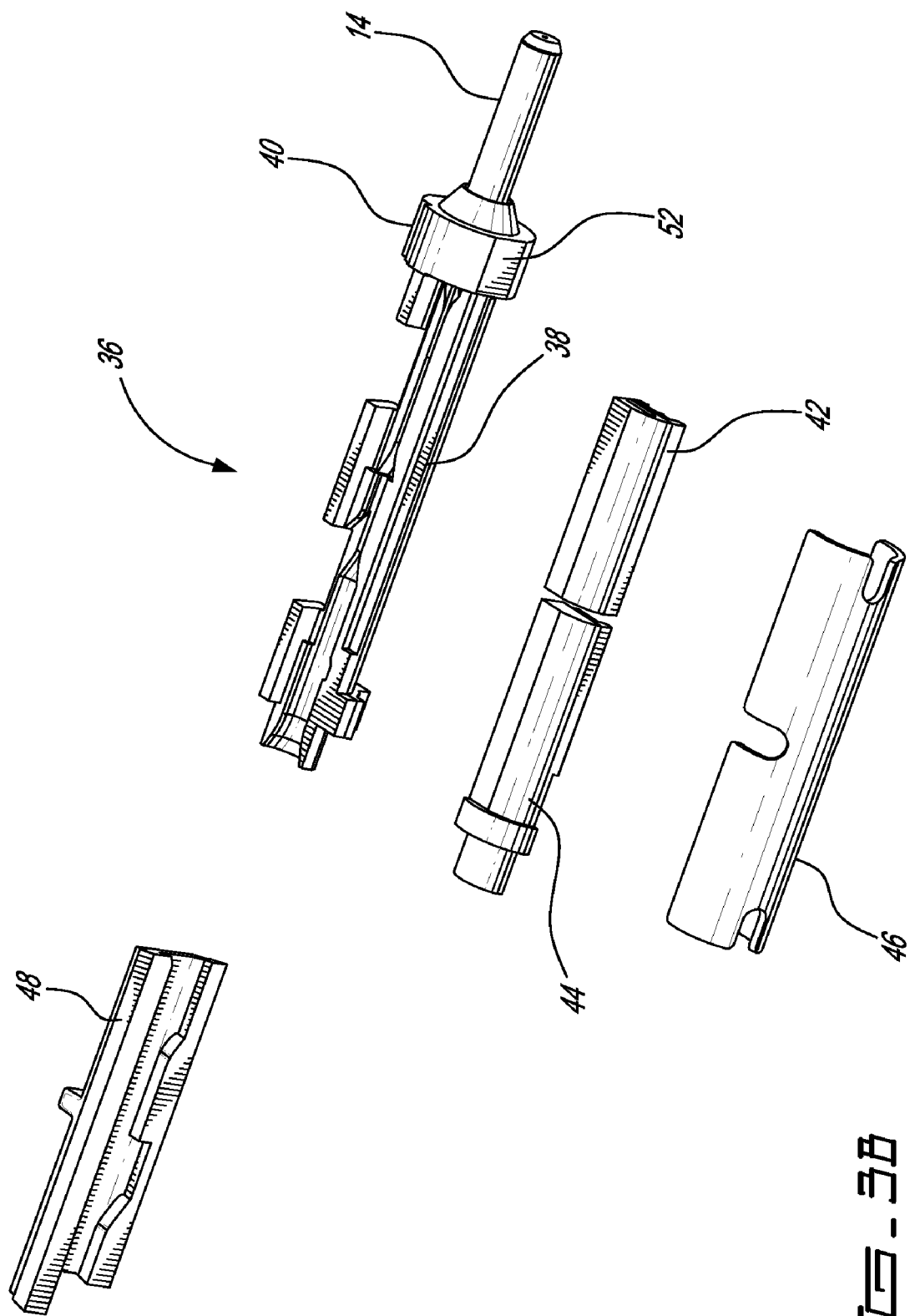

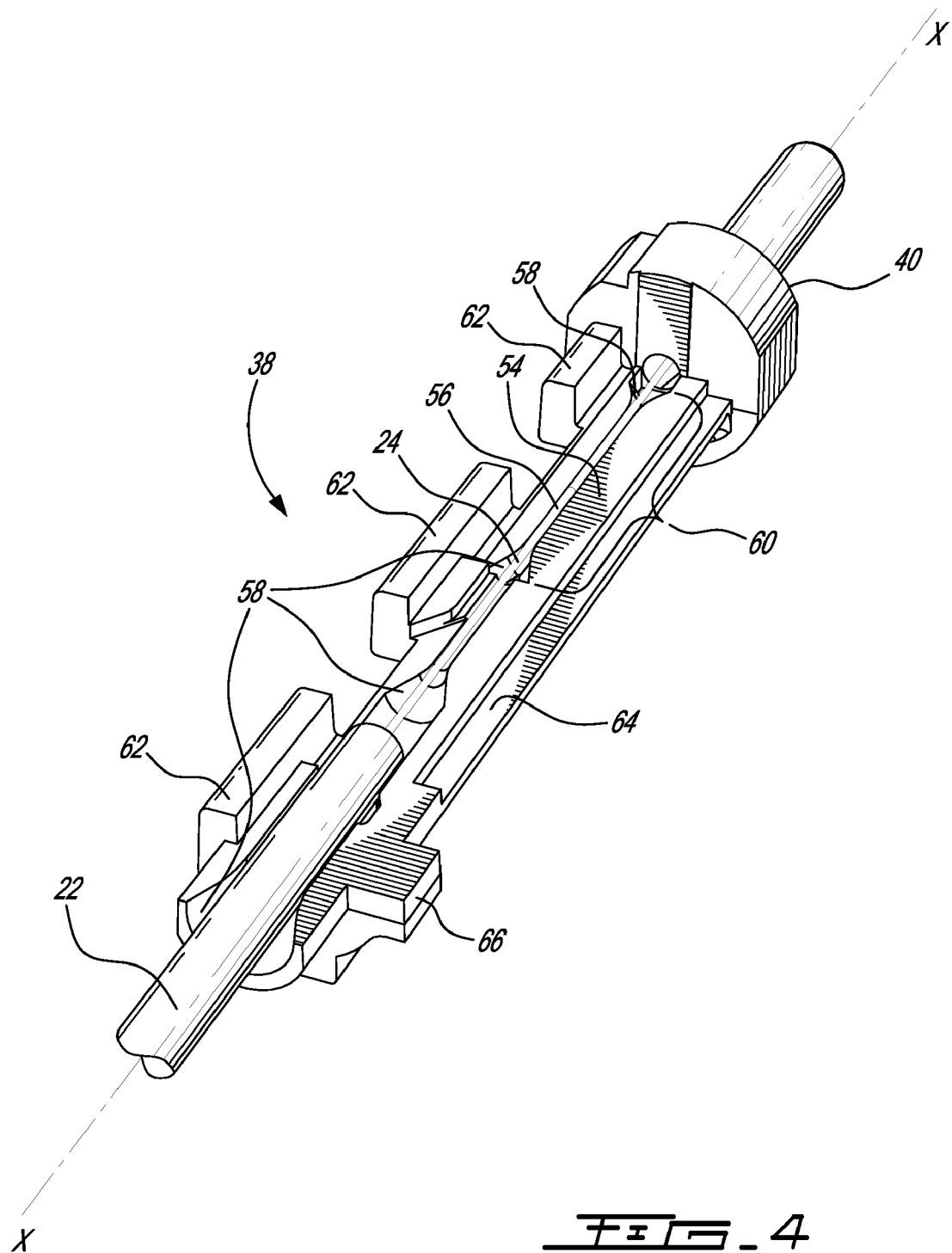
FIG_4

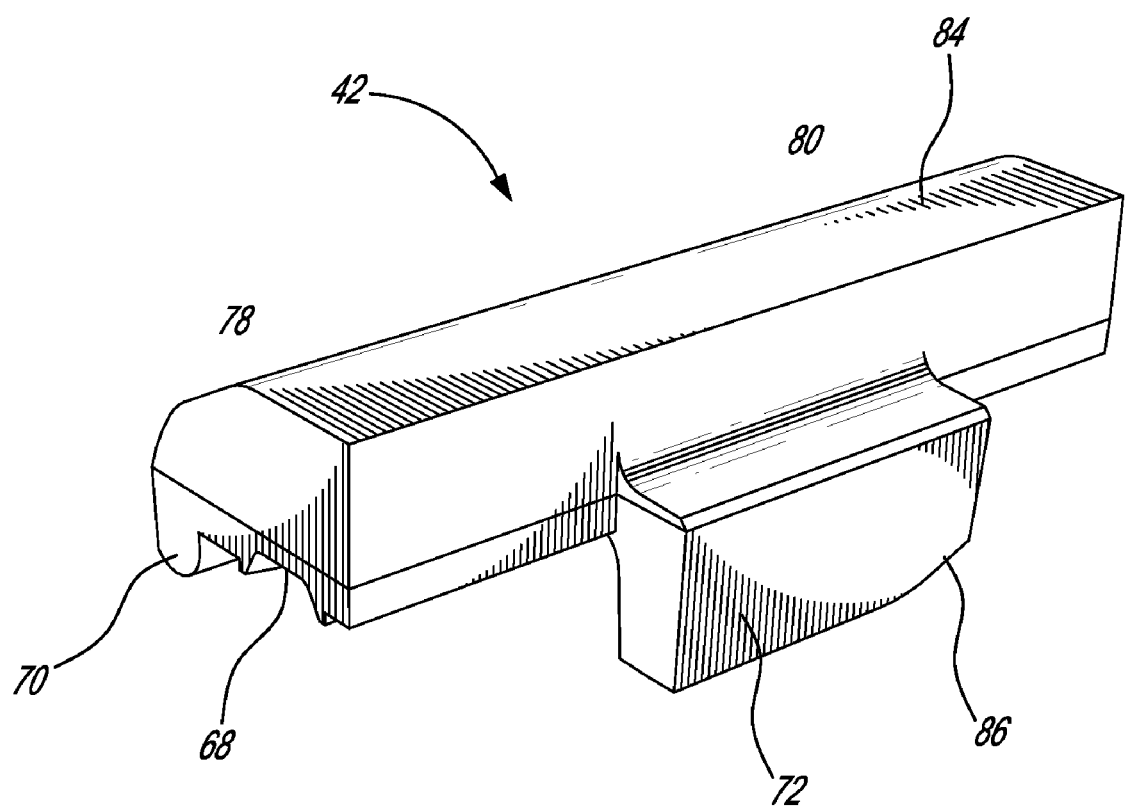
FIG_5A

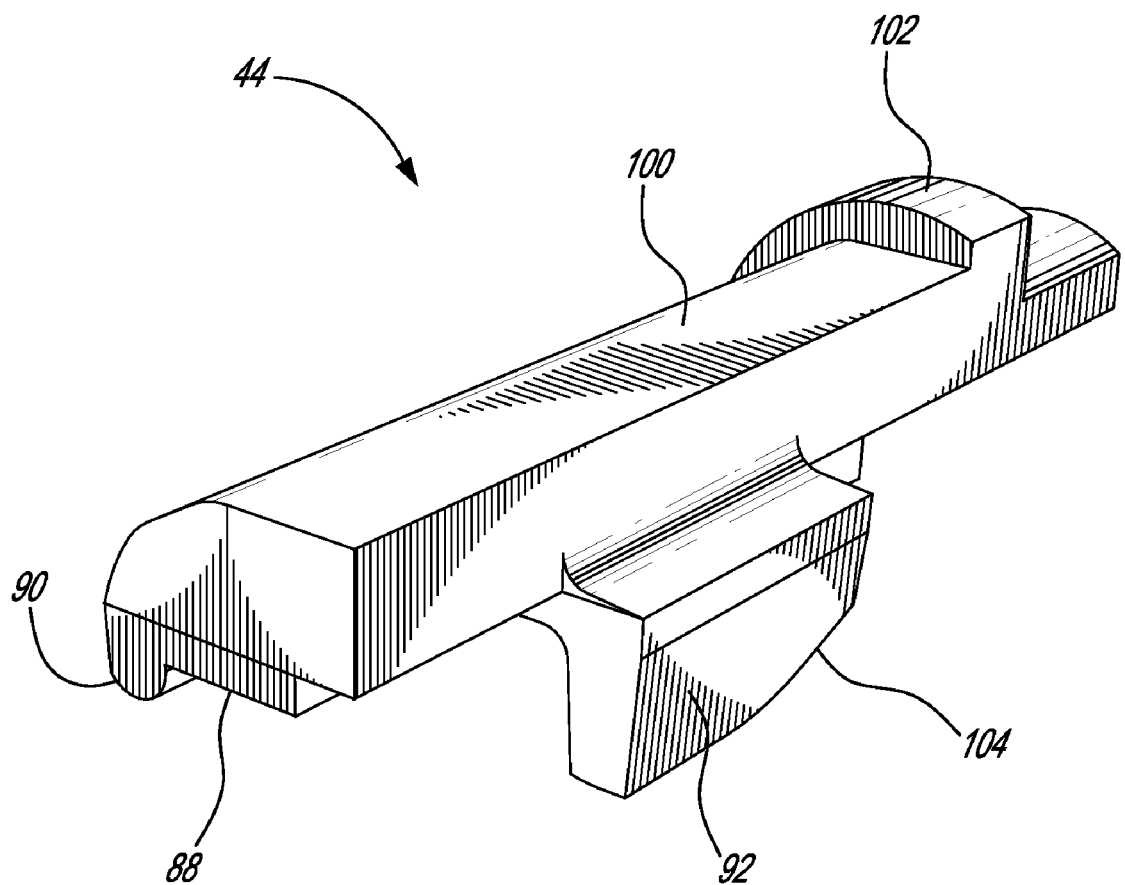
FIG_6A

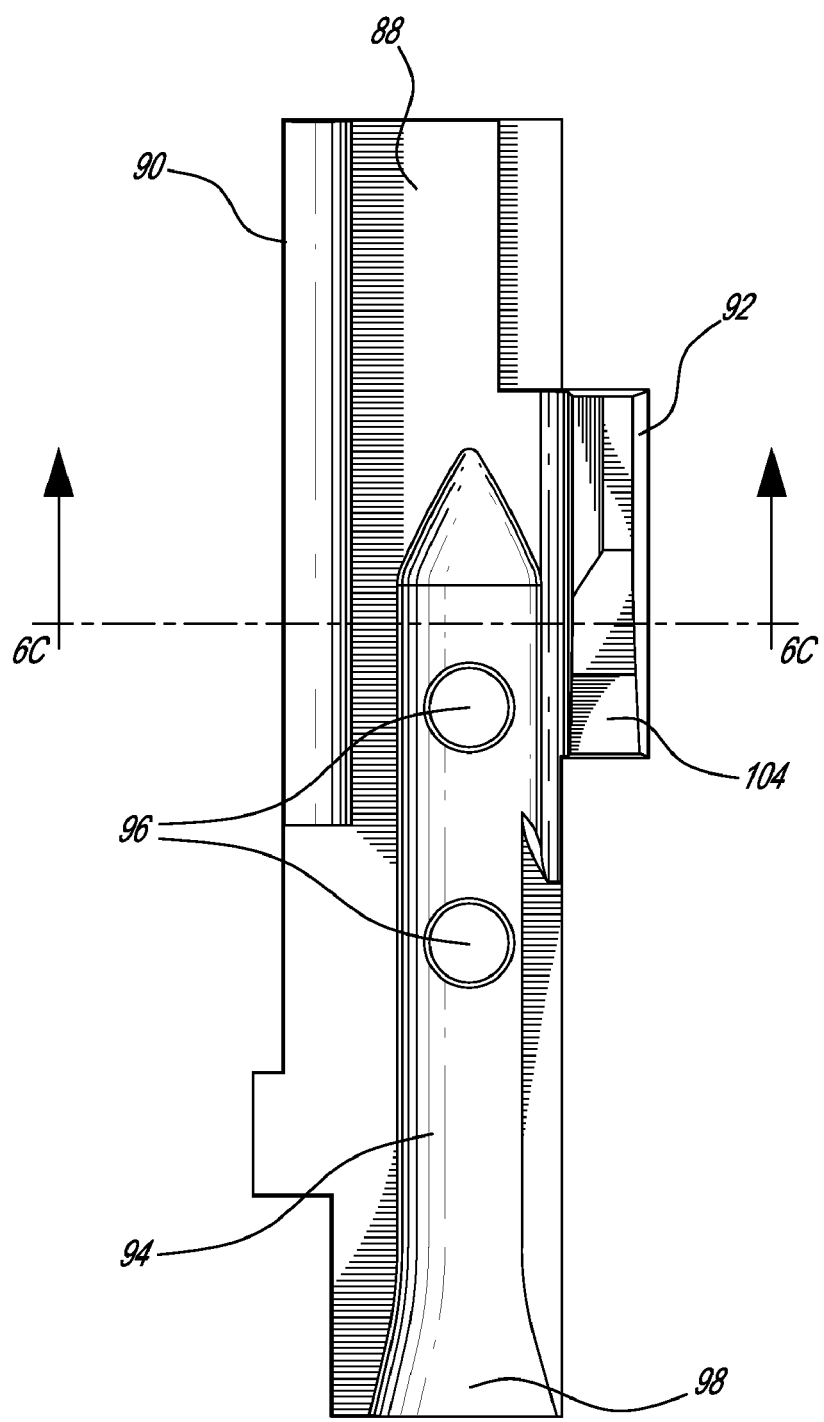
FIG_6B

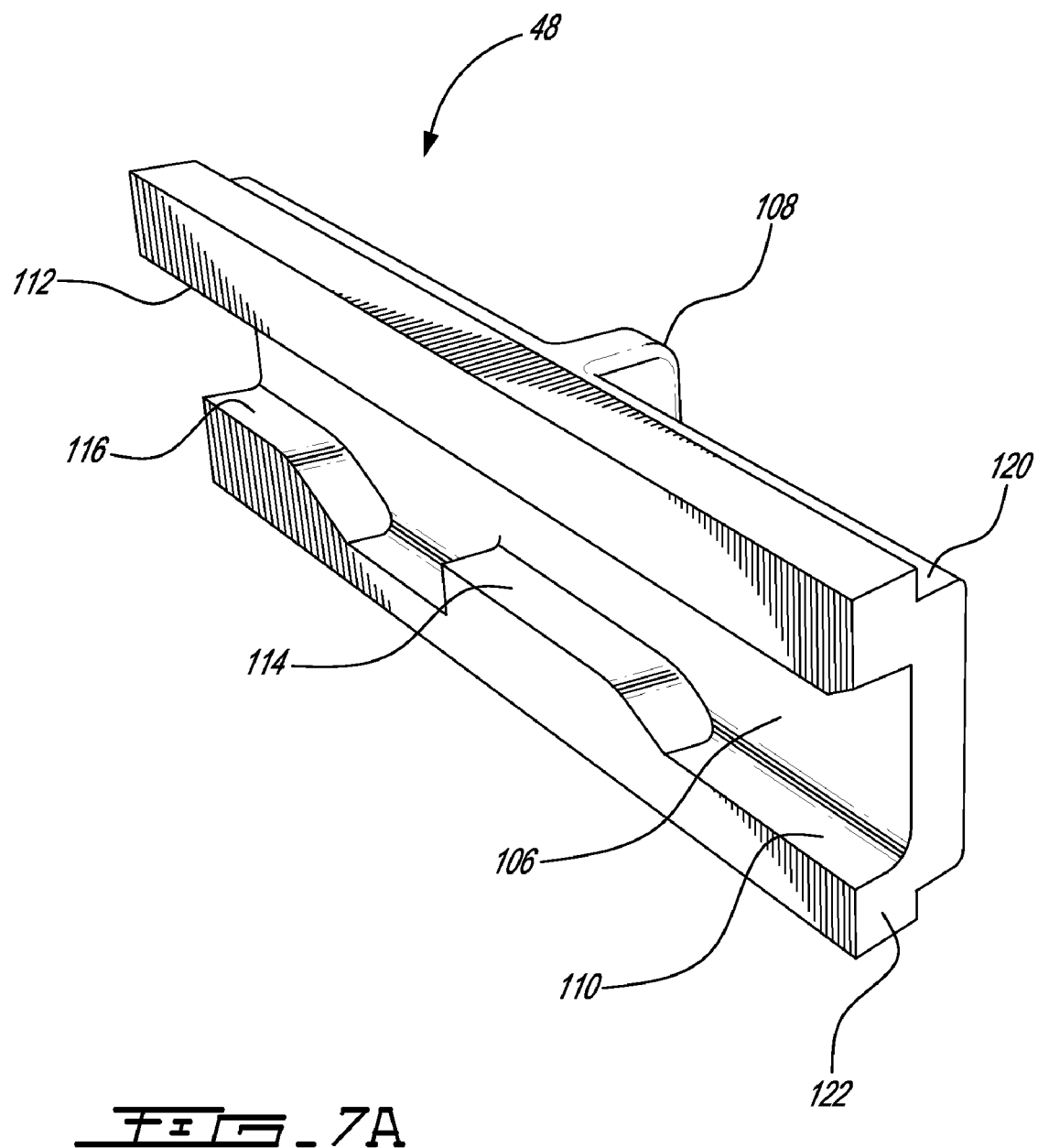
FIG_7A

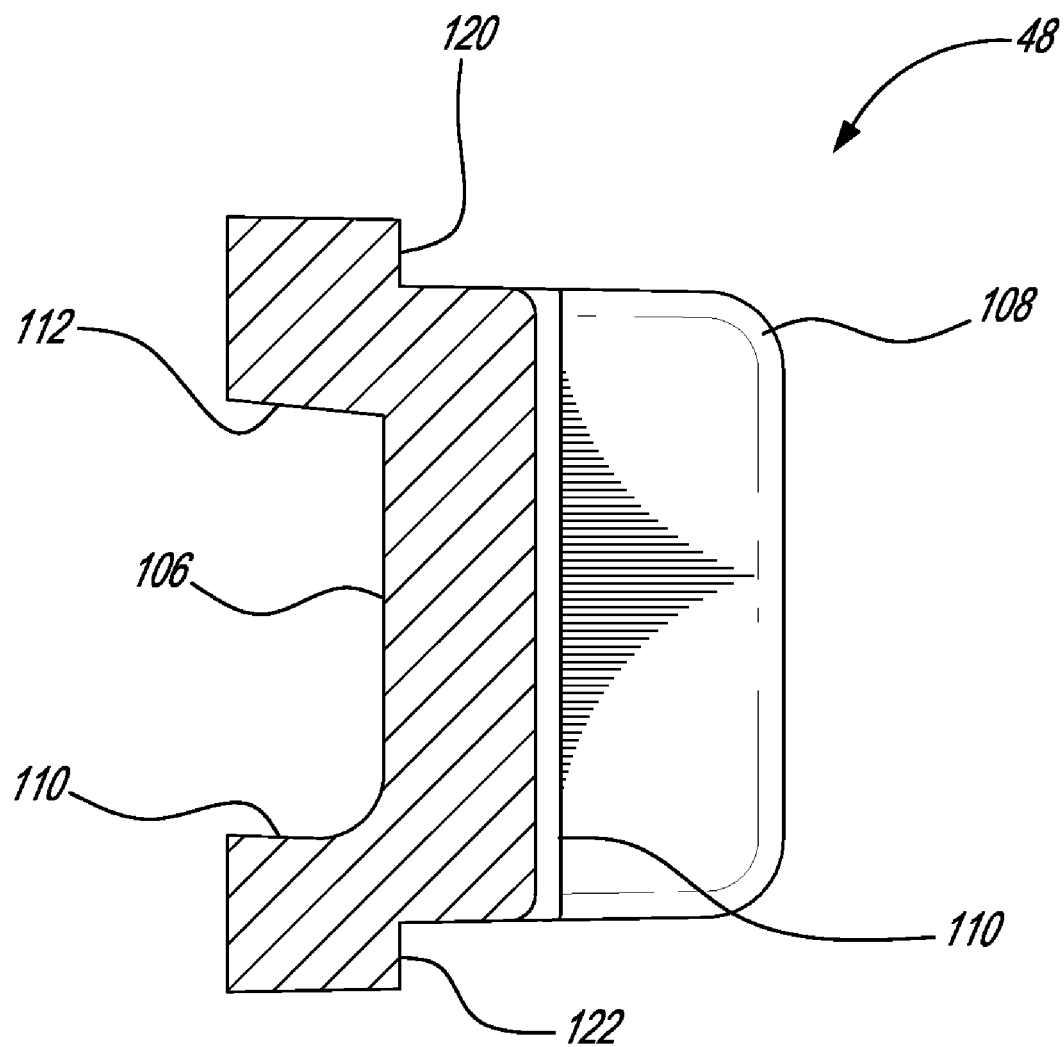
FIG_7C

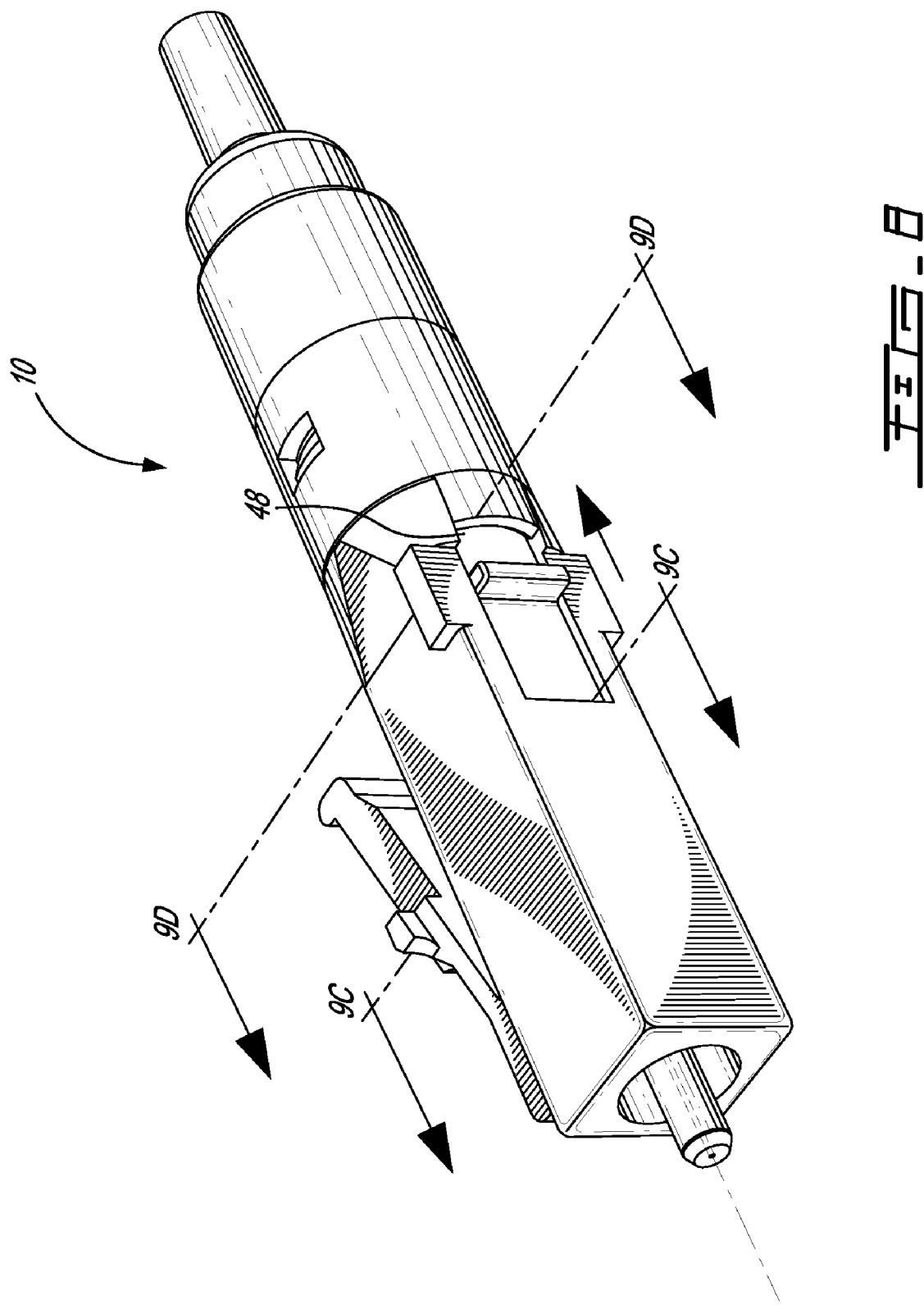

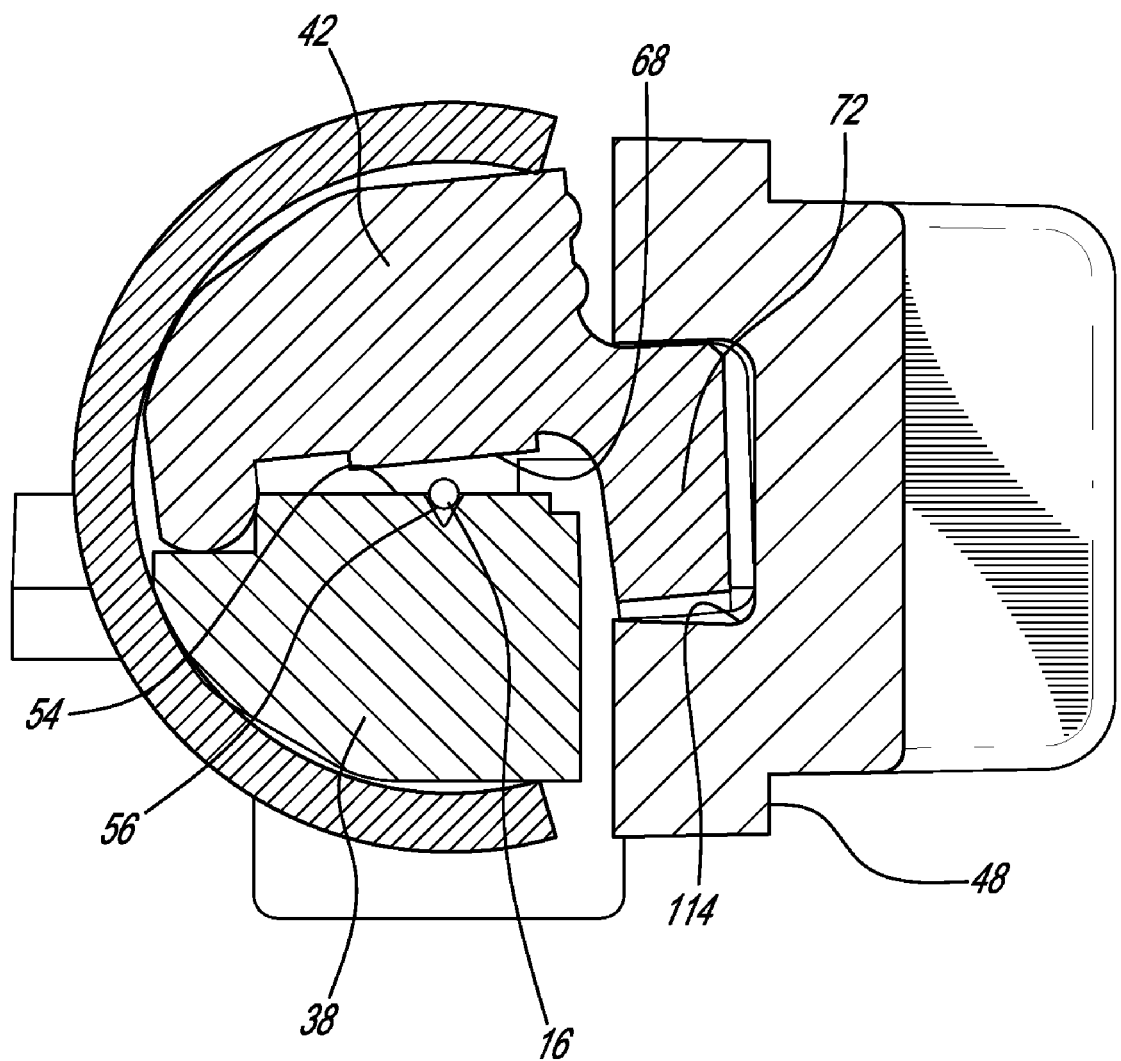
FIG_9A

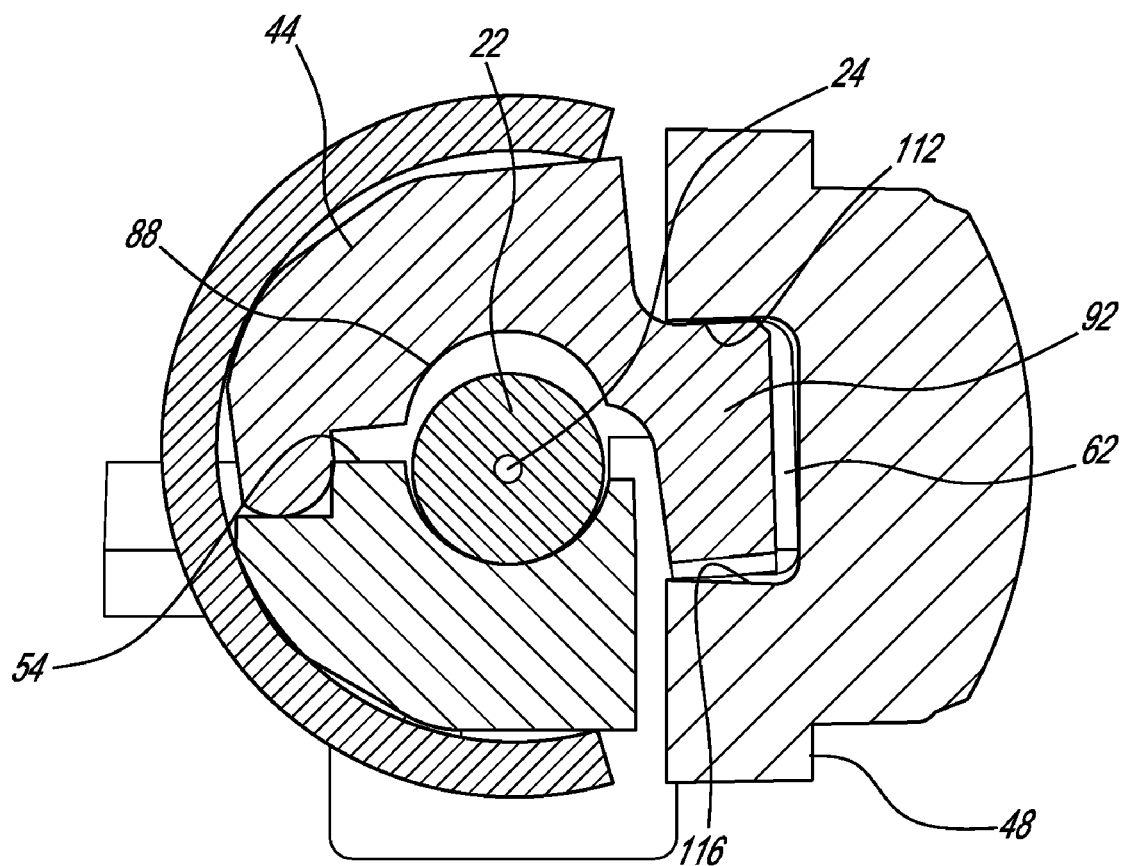
FIG_9B

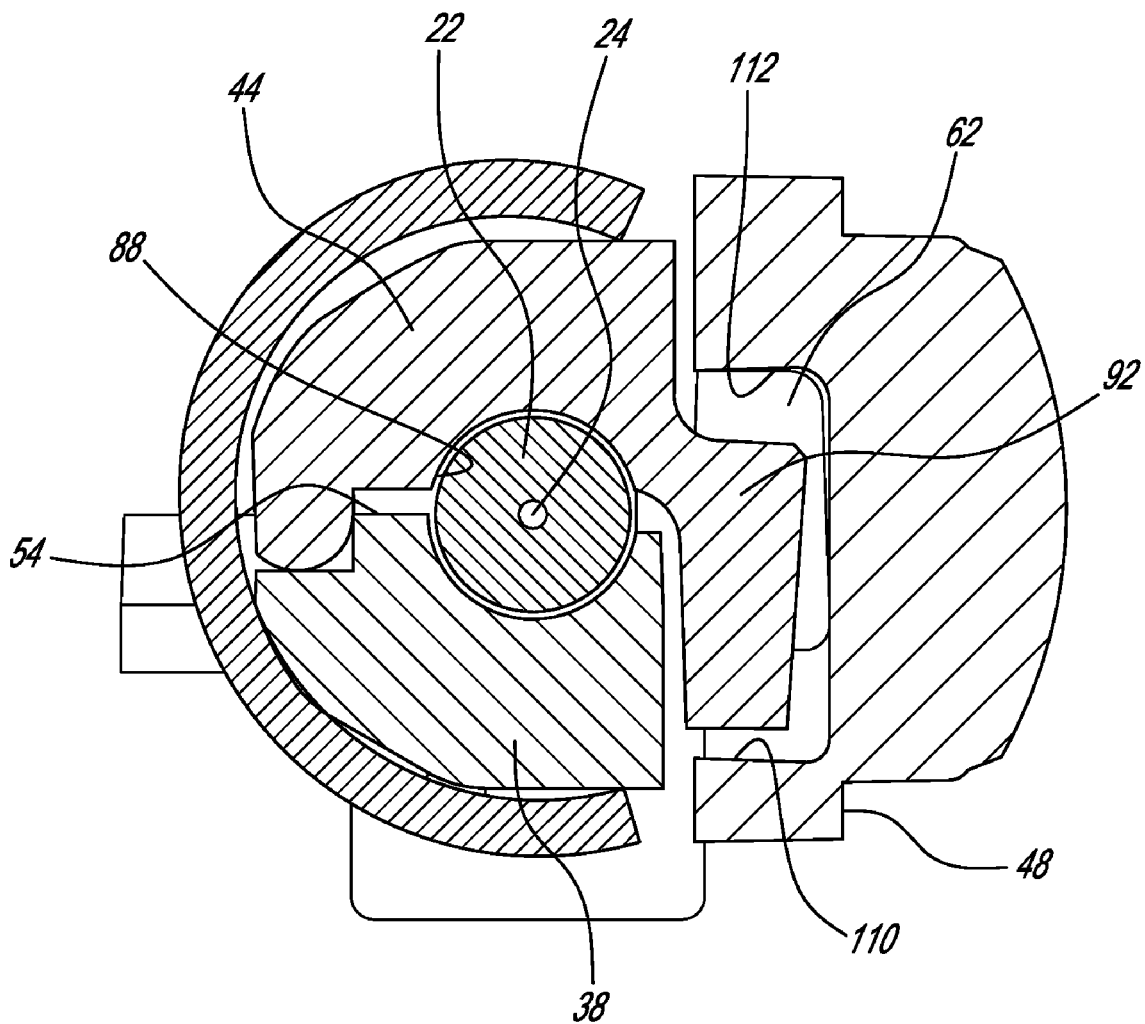
FIG_90

SLIDE ACTUATED FIELD INSTALLABLE FIBER OPTIC CONNECTOR

CROSS REFERENCE TO RELATED APPLICATIONS

This application claims priority, under 35 U.S.C. §119(e), of U.S. provisional application Ser. No. 61/090,089, filed on 19 Aug. 2008 which is incorporated herein in its entirety by reference.

FIELD OF THE INVENTION

The present invention relates to a field installable fiber optic connector comprising an integrated actuator for aligning and retaining an optical fiber stub and an adjoining optical fiber. In particular, the present invention relates to a reversible fiber optic connector comprising an integrated sliding actuator.

BACKGROUND OF THE INVENTION

Fiber optic systems are well-known for their difficult terminations. In particular, alignment of mating optical fibers within a fiber optic connector is critical to the connector's performance. To accurately align an optical fiber stub of a connector with a mating field optical fiber inserted into the connector, a biasing force is typically applied to at least one mechanical splice component comprised within the connector. In this manner, the optical fiber stub and the field optical fiber are both retained between opposing splice components, which are biased together by an actuator. Once the optical fibers are aligned and retained in optical continuity, the field optical fiber is then strain relieved to the connector by crimping a buffered portion of the field fiber.

Prior art connectors are however complex as fiber alignment and strain relief are typically performed in more than one step using more than one element of the connector, thus requiring additional materials and proving time and cost consuming. Another drawback is that the termination assembly is typically non-reusable since once the optical fibers have been strain relieved by applying a crimp, it is usually not possible to reverse the splice without destroying the connector assembly or damaging the optical fiber. Indeed, the crimping operation has the tendency to pull the field fiber and fiber stub apart or damage the signal-passing function of the interface. Also, although some connectors use a reusable termination system, such connectors generally require a specific activation tool dedicated to each type of system.

What is therefore needed, and an object of the present invention, is an easy to use fiber optic connector that reversibly and non-destructively terminates a field fiber inserted therein, thus alleviating the need for a second operation to crimp on the fiber cable.

Additionally, one style of reversible prior art connectors typically include an opening or other means into which a separate tool must be inserted to reverse the connection, thereby allowing for the ingress of dirt and moisture and the like.

Therefore what is also needed, and also an object of the present invention, is a tool-less closed reversible fiber optic connector that avoids contamination through the ingress of dirt and moisture and the like.

SUMMARY OF THE INVENTION

More specifically, in accordance with the present invention, there is provided a connector for reversibly terminating a cable comprising a buffer cladding surrounding an optical fiber wherein an end portion of the cable is exposed to reveal the optical fiber and an optical fiber splicing face. The connector comprises a fiber splice comprising a first pair of opposed surfaces and an alignment groove extending at least partially along one of the opposed surfaces, wherein the exposed optical fiber is positioned within the groove, a ferrule comprising a front face, an axial bore aligned with the groove and an optical fiber stub disposed in the bore and extending from the front face into the groove such that a stub splicing face of the optical fiber stub is positioned opposite the optical fiber splicing face of the optical fiber, and an integrated actuating assembly comprising a sliding actuator configured for sliding along a substantially straight path between a first position wherein the first pair of opposed surfaces are in a closed position and the exposed optic fiber and the optical fiber stub are clamped in the groove by the pair of opposed surfaces and a second position wherein the splice is in an open position and the exposed optic fiber can be removed from the groove.

There is also provided a connector for reversibly terminating a cable comprising a buffer cladding surrounding an optical fiber wherein an end portion of the cable is exposed to reveal the optical fiber. The connector comprises an elongate member comprising a first end, a second end and an alignment groove extending at least partially along a member surface thereof between the first end and the second end, wherein the exposed optical fiber is positioned within the groove and extending from the second end, a ferrule comprising a front face, a rear end positioned adjacent the first end, an axial bore aligned with the groove and an optical fiber stub disposed in the bore and extending from the front face into the groove such that a stub splicing face of the optical fiber stub is positioned opposite an optical fiber splicing face of the optical fiber, a clamping assembly comprising a splice anvil comprising a fiber clamping surface positioned facing the member surface and overlapping the stub splicing face and the optical fiber splicing face, and an integrated actuating assembly comprising a sliding actuator configured for sliding along a path substantially in parallel to the groove between a second position wherein the exposed optic fiber and the optical fiber stub are clamped in the groove between the fiber clamping surface and the member surface and a first position wherein the exposed optic fiber can be freely removed from or inserted into the connector.

Additionally, there is provided a connector for reversibly terminating a cable comprising a buffer cladding surrounding an optical fiber wherein an end portion of the cable is exposed to reveal the optical fiber. The connector comprises an elongate member comprising a first end, a second end and an alignment groove extending at least partially along a member surface thereof between the first end and the second end, wherein the exposed optical fiber is positioned within the groove and extending from the second end, a ferrule comprising a front face, a rear end positioned adjacent the first end, an axial bore aligned with the groove and an optical fiber stub disposed in the bore and extending from the front face into the groove such that a stub splicing face of the optical fiber stub is positioned opposite an optical fiber splicing face of the optical fiber, a clamping assembly comprising a splice anvil comprising a fiber clamping surface positioned facing the member surface and overlapping the stub splicing face and the optical fiber splicing face and a buffer cladding anvil positioned adjacent the splice anvil, the buffer cladding anvil comprising a buffer cladding clamping surface, and an actuating assembly for limiting movement of the clamping assembly between an unclamped state wherein the splice anvil and the buffer cladding anvil are in an open position and the exposed optic fiber can be freely removed from or inserted into the connector and an intermediate state wherein the splice anvil is in a closed position and the buffer cladding anvil is in the open position and the exposed optic fiber and the optical fiber stub are clamped in the groove by the fiber clamping surface and between said intermediate state and a clamped state wherein the splice anvil and the buffer cladding anvil are in the closed position and the buffer cladding is clamped against the elongate surface by the buffer cladding clamping surface.

There is additionally provided a connector for terminating a cable comprising a buffer cladding surrounding an optical fiber wherein an end portion of the cable is exposed to reveal the optical fiber and an optical fiber splicing face. The connector comprises a fiber splice comprising a first pair of opposed surfaces and an alignment groove extending at least partially along one of the opposed surfaces, wherein the exposed optical fiber is positioned within the groove, a ferrule comprising a front face, an axial bore aligned with the groove and an optical fiber stub disposed in the bore and extending from the front face into the groove such that a stub splicing face of the optical fiber stub is positioned opposite the optical fiber splicing face of the optical fiber, and an integrated actuator configured for movement between a closed position wherein the exposed optic fiber and the optical fiber stub are clamped in the groove by the pair of opposed surfaces and an open position wherein the exposed optic fiber can be removed from the groove. When a force required to move the actuator between the closed position and the open position is greater than a force required to move the actuator between the open position and the closed position.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 1 is a front perspective view of a slide actuated reversible fiber connector with the slide actuator in the open position in accordance with an illustrative embodiment of the present invention;

FIG. 2 is an exploded front perspective view of the fiber optic connector of FIG. 1;

FIG. 3B is an exploded side perspective view of the clamping assembly of FIG. 3A;

FIG. 4 is a rear perspective view of an elongate member in accordance with an illustrative embodiment of the present invention;

FIG. 5A is a perspective view of a splice anvil in accordance with an illustrative embodiment of the present invention;

FIG. 6A is a perspective view of a buffer cladding anvil in accordance with an illustrative embodiment of the present invention;

FIG. 6B is a bottom plan view of the buffer cladding anvil of FIG. 6A;

FIG. 7A is a perspective view of a sliding actuator in accordance with an illustrative embodiment of the present invention;

FIG. 7C is a sectional view of the sliding actuator of FIG. 7B along 7C-7C;

FIG. 8 is a front perspective view slide actuated reversible fiber connector of FIG. 1 with the slide actuator in the closed position;

FIG. 9A is a sectional view along 9A-9A in FIG. 1;

FIG. 9B is a sectional view along 9B-9B in FIG. 1;

FIG. 9D is a sectional view along 9D-9D in FIG. 8;

DETAILED DESCRIPTION OF THE ILLUSTRATIVE EMBODIMENTS

Figure 3A:
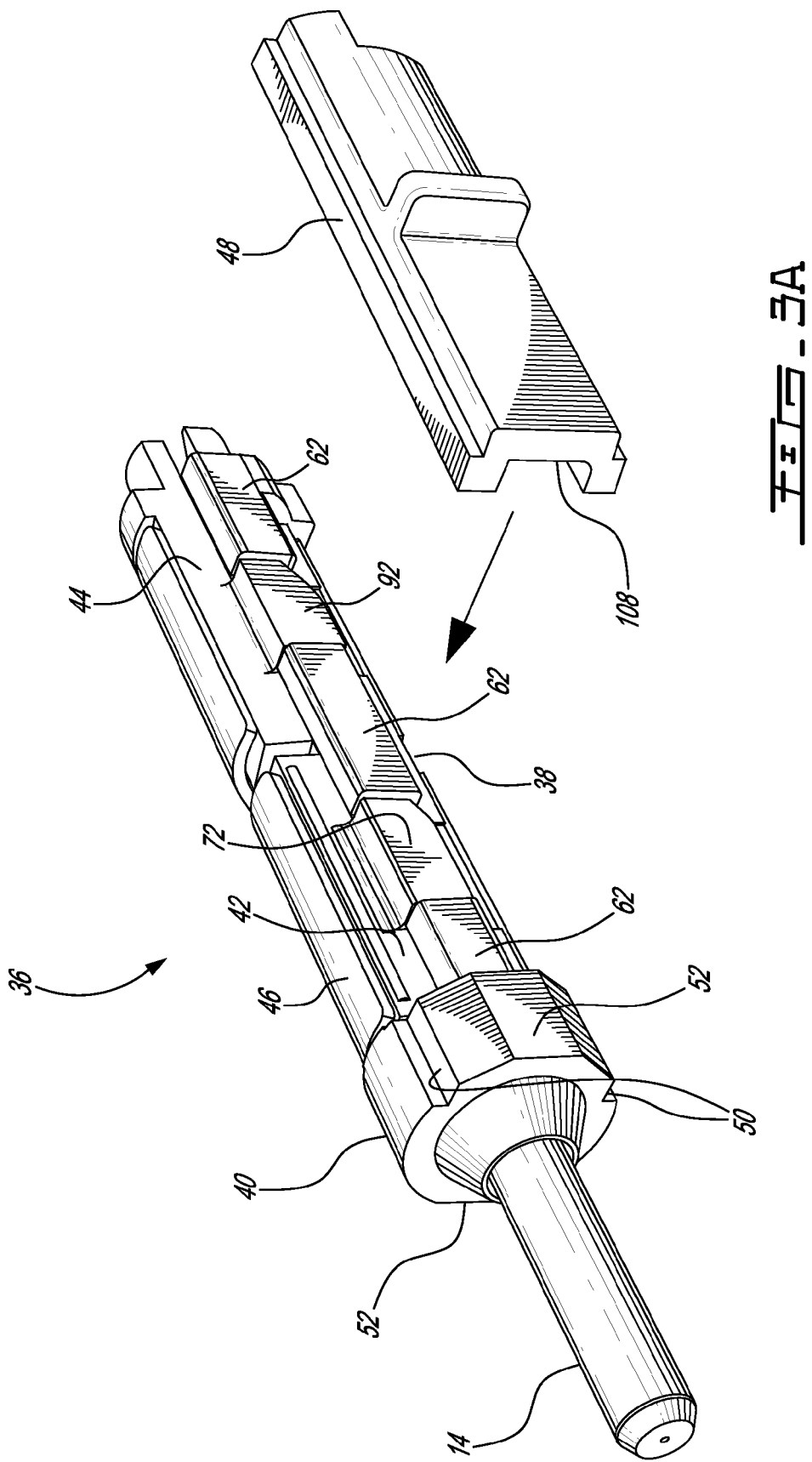
FIG. 3A is a partially exploded front perspective view of a clamping assembly in accordance with an illustrative embodiment of the present invention.

Referring now to FIG. 1, and in accordance with an illustrative embodiment of the present invention, a reversible fiber connector assembly, generally referred to using the reference numeral 10, will now be described. The connector 10 is illustratively a re-terminable, no-crimp Local Connector (LC)-type optical connector that comprises a housing 12 and a ferrule 14 comprising an axial bore into which an optical fiber stub 16 is received extending therefrom. The connector 10 further is adapted to receive a mating fiber optic cable 18, an end of which is inserted into the connector 10 along the indicated direction "A" for termination. The fiber optic cable 18 is illustratively prepared for insertion into the connector 10 by cleaving the fiber optic cable 18 and removing a portion of the cable jacket 20 and coated or buffered cladded portion 22 to expose a predetermined length of the bare optical fiber 24.

Still referring to FIG. 1, a latch 26 is further provided on an upper surface of the connector 10 for mechanically releasably interlocking the connector with an appropriate receptacle of a patch panel or other device (both not shown) upon insertion of the front end 28 of the connector 10 into the receptacle, thereby permitting signals to pass between the terminated fiber optic cable 18 and the device. Additionally, a flexible strain relieving rubber boot 30 provides protection against overbending of the fiber optic cable 18 during use.

Referring now to FIG. 2, the connector housing 12 is comprised of a first housing part 12a and a second housing part 12b, which are configured for interconnection by partial insertion of the first housing part 12a into the second housing part 12b. Once assembled, the housing parts 12a, 12b are held together by a series of tabs 32 and apertures 34 into which the tabs 32 are inserted thereby providing a mechanical interlock. The first housing part 12a and the second housing part 12b define an elongate cavity extending between the front and rear ends of the connector 10 along a longitudinal axis X. The housing 12 is adapted to receive an elongate ferrule holder 36 while allowing some travel of the elongate ferrule holder 36 along the longitudinal axis X. Additionally, a biasing mechanism such as a spring 38 is provided for biasing the ferrule holder 36, and therefore the ferrule 14, which is held securely within the ferrule holder 36, towards the front end 28.

Referring now to FIGS. 3A and 3B, the ferrule holder 36 comprises an elongate member 38 comprising a collar 40 into which the ferrule is received. The ferrule holder 36 further comprises a fiber splice, or clamping assembly, illustratively comprising a splice anvil 42, a buffer cladding anvil 44 and a C spring 46 for biasing the anvils 42, 44 towards the elongate member 38. Additionally, an actuating assembly comprising a sliding actuator 48, the operation of which will be discussed in more detail below, is also provided. A pair of notches 50 are provided in the collar 40 as well as a pair of flat surfaces 52 positioned on opposite sides of the collar 40 sides which, upon assembly engage corresponding features (not shown) moulded on the inside of the housing (reference 12 in FIGS. 1 and 2), thereby ensuring that the ferrule holder 36 is correctly aligned and held stably within the housing 12.

Referring now to FIG. 4, the elongate member 38 comprises a substantially flat elongate member surface 54 which is moulded or otherwise machined to comprise an alignment groove 56 extending along a length thereof and aligned with the axis X. The member surface 54 is additionally moulded to included a series of funnel shaped lead in portions as in 58 which provide a smooth transition for the fiber stub 16 and the optical fiber 24 to be routed into the groove 56 from either end, thus protecting the splicing end faces of the fibers 16, 24 from damage during installation. Additionally, illustratively the diameter of the groove 56 is reduced at the outlet of each of the funnel shaped lead in portions as in 58 in order to accommodate the thickness of both the cladded portion 22 of the optic fiber cable 18 and the stripped end portion which reveals the exposed optical fiber 24.

Still referring to FIG. 4, the forward, or alignment, end 60 of the groove 56 is illustratively of a "V" shaped cross section. However, although the forward end 60 of the groove 56 has been shown as V-shaped for illustrative purposes, the alignment end 60 could have any other shape (e.g. square or "U-groove") suitable for receiving and aligning the fiber stub 16 and the adjoining optical fiber 24 within the connector 10 so as to ensure accurate termination. Also, although only one groove 56 has been illustrated, it will be apparent to a person skilled in the art that the connector 10 may be provided with a plurality of grooves as in 56 to accommodate a dual-fiber or multi-fiber connector having two (2) or more fiber stubs as in 16. Additionally, a series of raised alignment bosses as in 62 are provided along a long edge of the elongate member 38 as will be seen below for engaging with the sliding actuator (reference 48 in FIG. 3A) and positioned opposite a step like impression 64 which, as will be seen below, receives the anvils 42, 44. An additional raised abutment 66 is positioned towards an end of the elongate member 38 opposite the collar 40.

Figure 5B:
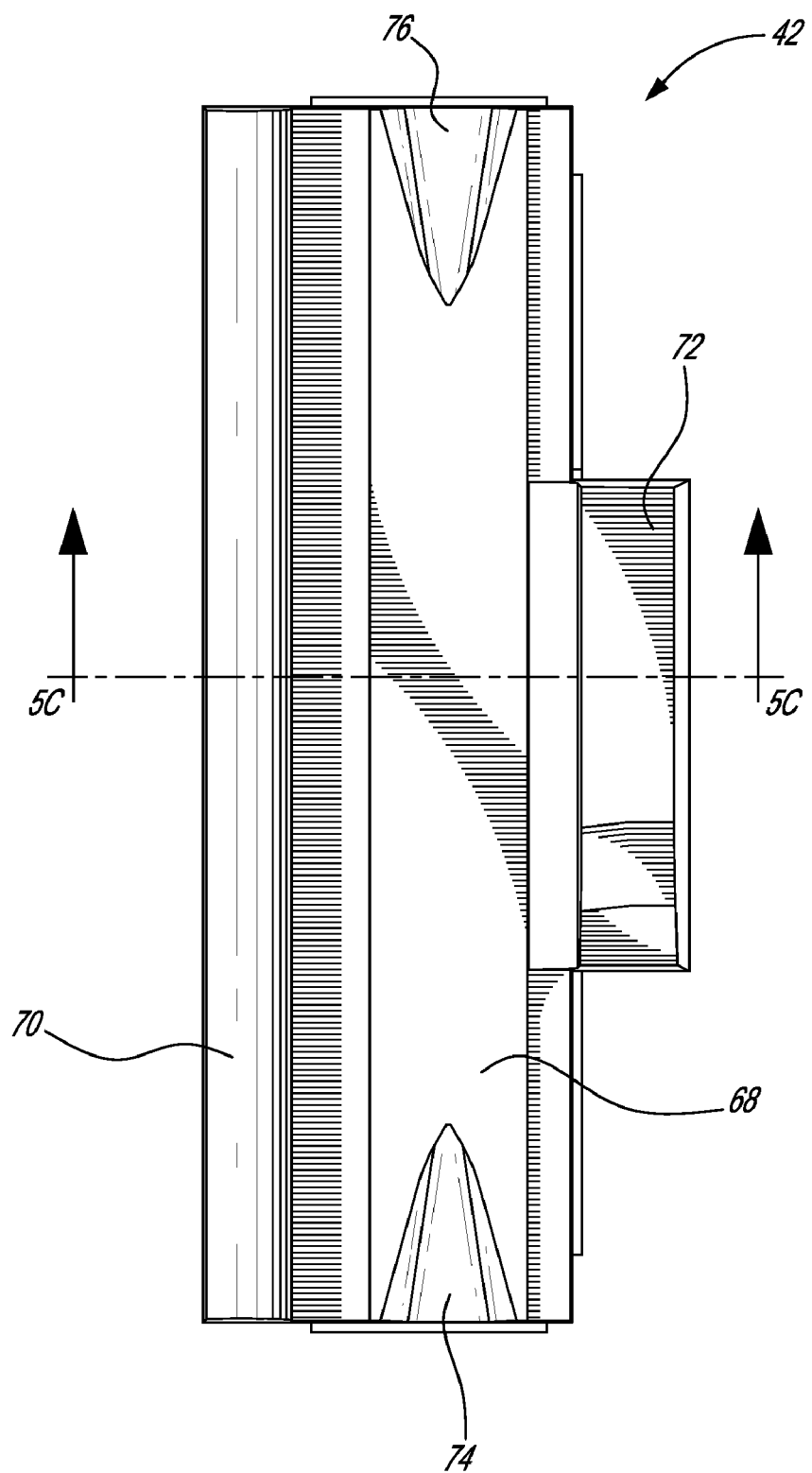
FIG. 5B is a bottom plan view of the splice anvil of FIG. 5A.
Figure 5C:
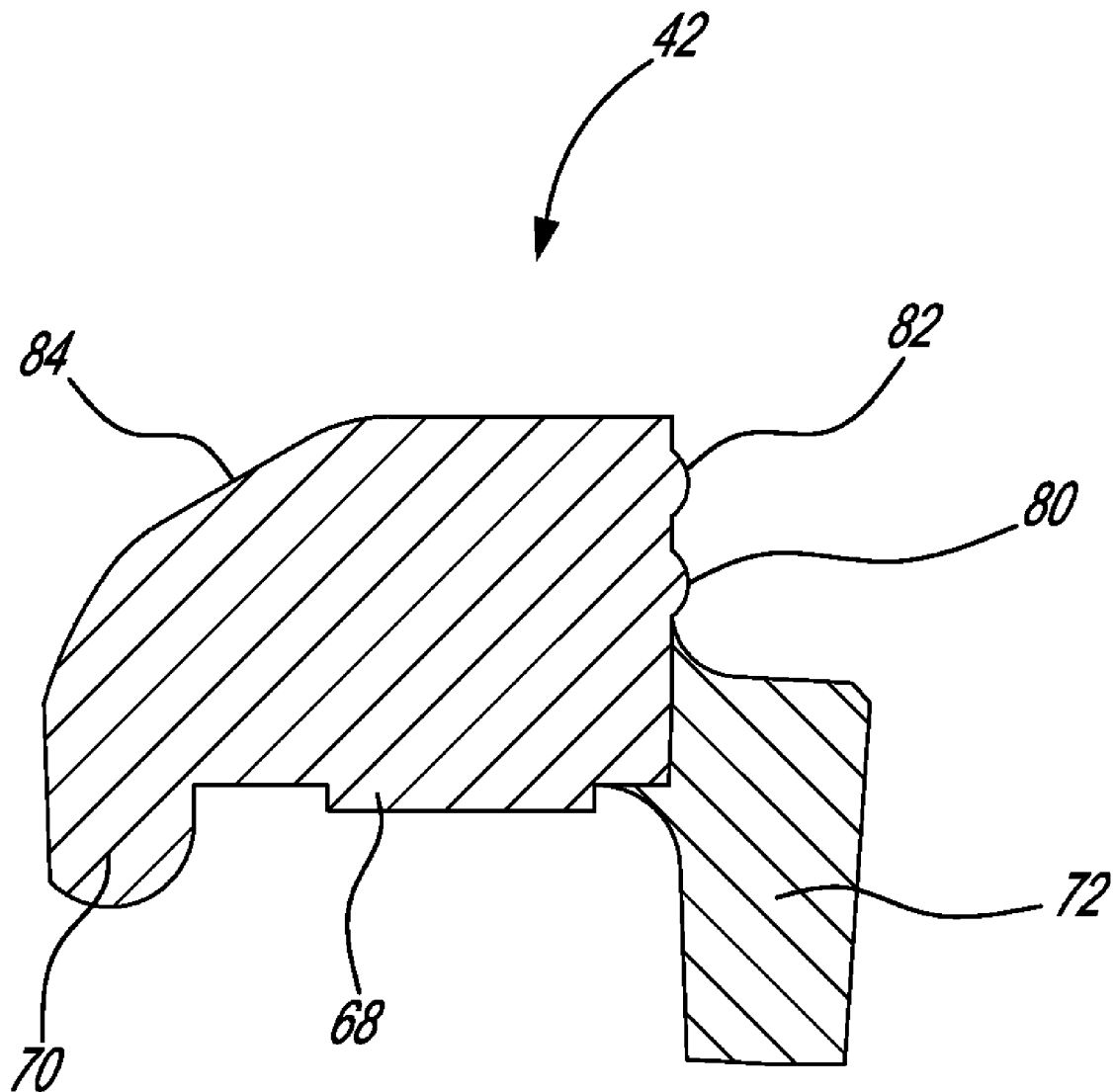
FIG. 5C is a sectional view of the splice anvil of FIG. 5B along 5C-5C.

Referring now to FIGS. 5A, 5B and 5C, the splice anvil 42 comprises a slightly raised optic fiber clamping surface 68, a raised long edge 70 which as will be seen below acts as a hinge, and an alignment boss 72. The clamping surface 68 is moulded to include a pair of opposed funnel-like indents 74, 76 at either end. The outer surface 84 of the splice anvil is curved to fit snugly within the C spring (reference 46 in FIG. 3B). The alignment boss 72 includes a chamfered actuating slide engaging edge 86 in order to better engage with the inner surface of the sliding actuator (reference 48 in FIG. 3B), as will be discussed in more detail below. Illustratively, the splice anvil 42 is manufactured at least in part from a translucent or transparent material in order to allow for the propagation of light there through.

Figure 6C:
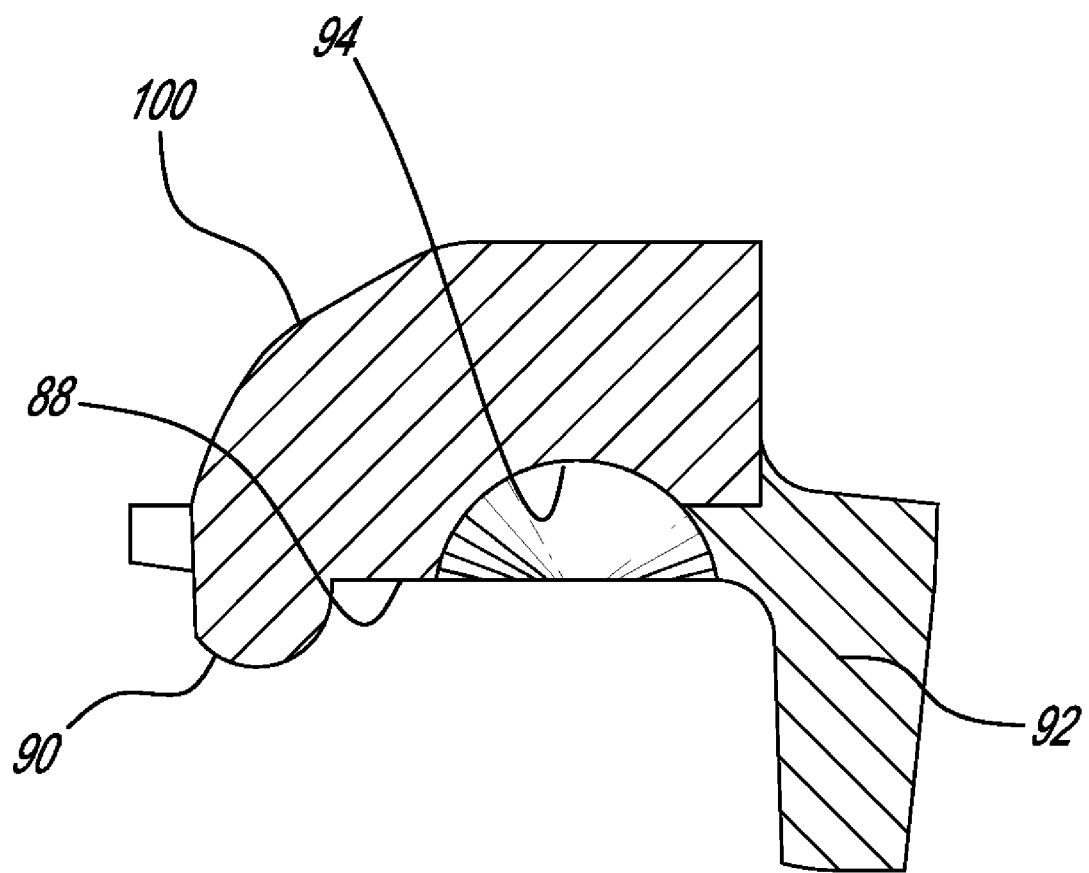
FIG. 6C is a sectional view of the buffer cladding anvil of FIG. 6B along 6C-6C.

Referring now to FIGS. 6A, 6B and 6C, the buffer cladding clamping anvil 44 comprises a buffer cladding clamping surface 88, a raised long edge 90 which acts as a hinge, and an alignment boss 92. The clamping surface 88 is profiled with a curved groove 94 configured to receive a cladded portion of the optic fiber (not shown). A pair of circular indents 96 are positioned in the groove 94 which allow for a slight ingress of the buffer cladding thereby providing additional mechanical resistance against removal of the optic fiber cable from the groove 94. Additionally, the groove 94 includes a funnel-like lead in portion 98 to ameliorate insertion of the fiber optic cable. Similar to the splice anvil (FIGS. 5A through 5C), the outer surface 100 of the buffer cladding clamping anvil 44 is curved to fit snugly within the C spring (reference 46 in FIG. 3B). A raised boss 102 is also provided towards one end of the buffer cladding clamping anvil 44 which, on assembly, combines with the raised abutment (reference 66 on FIG. 4) to form a second collar like feature which butts snugly against an outer edge of the C spring 46. Also, similar to the splice anvil 42. The alignment boss 92 includes a chamfered actuating slide engaging edge 104.

Figure 7B:
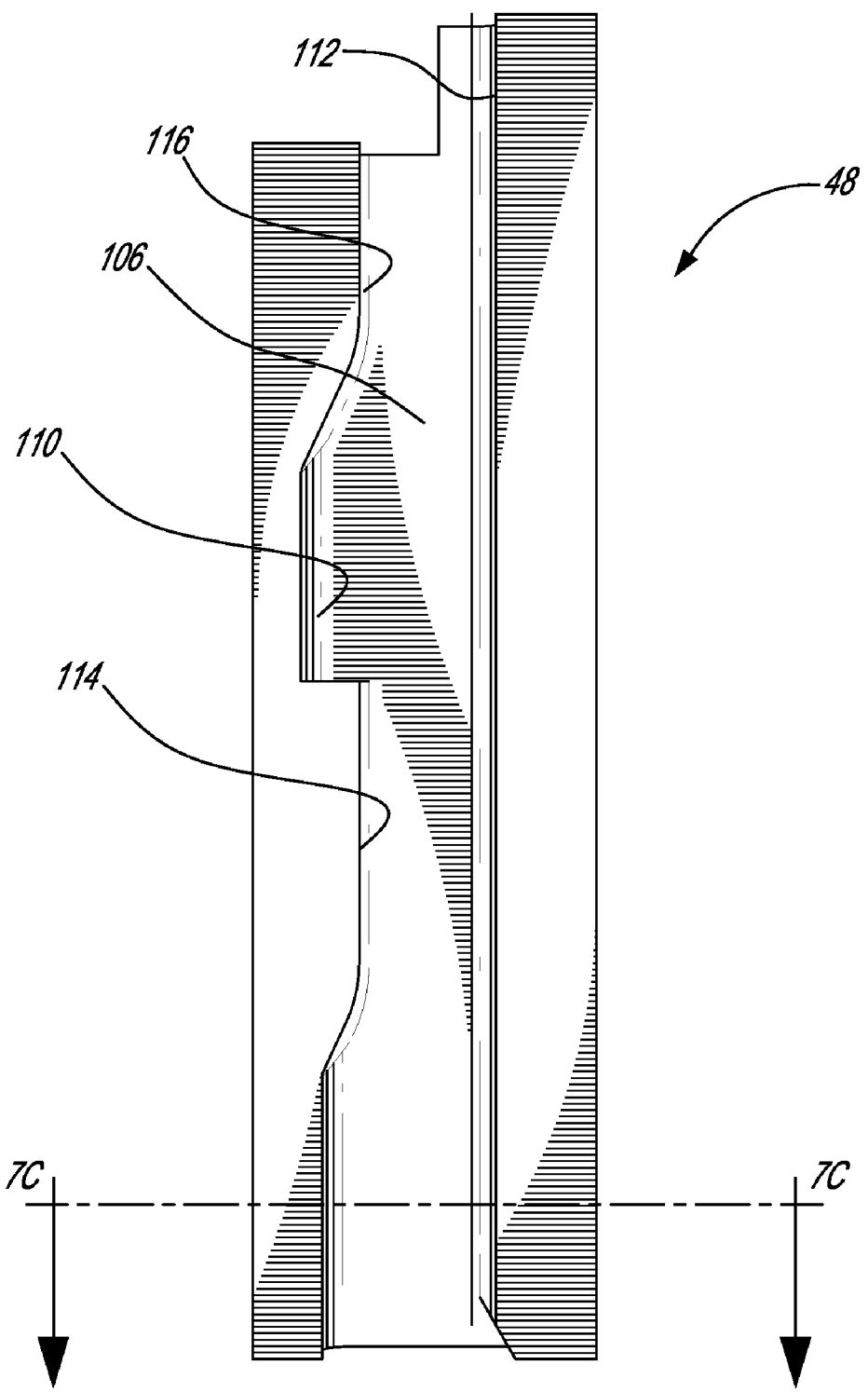
FIG. 7B is a bottom plan view of the sliding actuator of FIG. 7A.

Referring now to FIGS. 7A, 7B, and 7C, the sliding actuator 48 comprises a profiled inner surface 106 and a raised finger actuator 108 on an outer surface thereof. The profiled inner surface 106 comprises a pair of opposed tracks 110, 112. The first (illustratively lower) track 110 comprises a pair of raised surfaces 114, 116 which are positioned closer to the second (illustratively upper) 112 track than the rest of the first track 110.

Referring now to FIG. 1 in addition to FIGS. 7A, 7B, and 7C, a cut-away portion 118 is provided in the housing 12 such that once the sliding actuator 48 is assembled within the housing 12, the raised finger actuator 108 projects outside of the housing 12 for actuation by the user (not shown). In this regard, the outer surface of the sliding actuator 48 is profiled with a pair of flanges 120, 122 such that it is retained within the housing 12 while the raised finger actuator 108 is able to project outside of the housing 12. Illustratively, the sliding actuator 48 is fabricated from a translucent or transparent material in order to allow for the propagation of light there through.

Referring now back to FIG. 3A, during assembly the anvils 42, 44 are mounted onto the elongate member 38 and this assembly held together the C spring. Referring to FIGS. 4, 5A and 6A this causes the optic fiber clamping surface 68 and the buffer cladding clamping surface 88 to rest against the member surface 54 and the respective raised long edges 70, 90 of the splice anvil 42 and the buffer cladding anvil 44 to fit into the impression 64.

Referring Back to FIG. 3A, the sliding actuator 48 is then mounted to the elongate member 38/anvil 42, 44 assembly by fitting the profiled inner surface 106 of the sliding actuator 48 over the raised bosses alignment bosses 62, 72 and 92 of respectively the elongate member 38 and the anvils 42, 44. Movement of the sliding actuator 48 back and forth along the elongate member 38/anvils 42, 44 assembly, which is achieved by applying a lateral force via the raised finger actuator 108, causes the lower track 110 and the upper track 112 to respectively engage the anvil alignment bosses 72, 92 and the elongate member alignment bosses 62 which in turn causes the splice anvil 42 and the buffer cladding anvil 44 to respectively rotate relative to the elongate member along a line of intersection between the raised long edges 70, 90 and the impression 64. This in turn, depending on the direction of sliding, increases and decreases the distance between the optic fiber clamping surface 68, the buffer cladding clamping surface 88 and the member surface 54, thereby providing for clamping or release of the optic fiber and the buffer cladding. Using the force of the C spring 46 in order to clamp ensures that the optic fiber clamping surface 68, the buffer cladding clamping surface 88 and the member surface 54 remain normally closed with a predictable pre-calculated force.

Referring again to FIG. 7A in addition to FIG. 3A, the upper track 112 generally engages the alignment bosses 62 of the elongate member 38 while the lower track 110 generally engages the alignment bosses 72, 92 of respectively the splice anvil 42 and the buffer cladding anvil 44. By staggering the placement of the raised surfaces 114, 116 the alignment bosses 72, 92 of respectively the splice anvil 42 and the buffer cladding anvil 44 can be engaged and disengaged by the lower track 110 at different positions of the sliding actuator 48. This allows, for example, that the splice anvil 42 can be engaged prior to the buffer cladding anvil 44 such that the optic fibers are spliced prior to the buffer cladding being held by the buffer cladding anvil 44 (as is illustrated) which generally provides for a more reliable connection between the fiber stub and the optic fiber.

In addition, the use of alignment bosses as in 62, 72 and 92 enables the connector 10 of the present invention to advantageously eliminate the risk of infiltration of any contaminant between the elongate member 38 and the anvils 42, 44. Indeed, as the alignment bosses as in 62, 72 and 92 extend within the housing 12 tangentially, they offer a protection against penetration of particles, such as debris, dust, and the like, present in the surrounding environment into the housing 12 (and more particularly between the elongate member 38 and the anvils 42, 44), thus minimizing potential fiber contamination and damage.

Referring now to FIGS. 1 and 8, the reversible fiber connector assembly 10 of the present application is shown respectively with the sliding actuator 48 in the open and closed positions.

Referring now to FIG. 9A, with the sliding actuator 48 in the open position the alignment boss 72 of the splice anvil 42 is forced into alignment with the alignment bosses as in 62 of the elongate member 38 by the raised surface 114, and a gap between the optic fiber clamping surface 68 and the member surface 54 is thereby maintained. Similarly, referring to FIG. 9B with the sliding actuator 48 in the open position the alignment boss 92 of the buffer cladding anvil 44 is forced into alignment with the alignment bosses as in 62 by the raised surface 116 and a gap between the buffer clamping surface 88 and the member surface 54 is thereby maintained. In the open position, a suitably prepared fiber optic cable 18 can be inserted into the connector 10 until the cleaved end of the bare glass fiber 24 comes to rest against the cleaved end of the optical fiber stub 16. Typically an index matching gel or the like is positioned between the cleaved end of the bare glass fiber 24 and the cleaved end of the optical fiber stub 16 in order to improve light transmission.

Figure 9C:
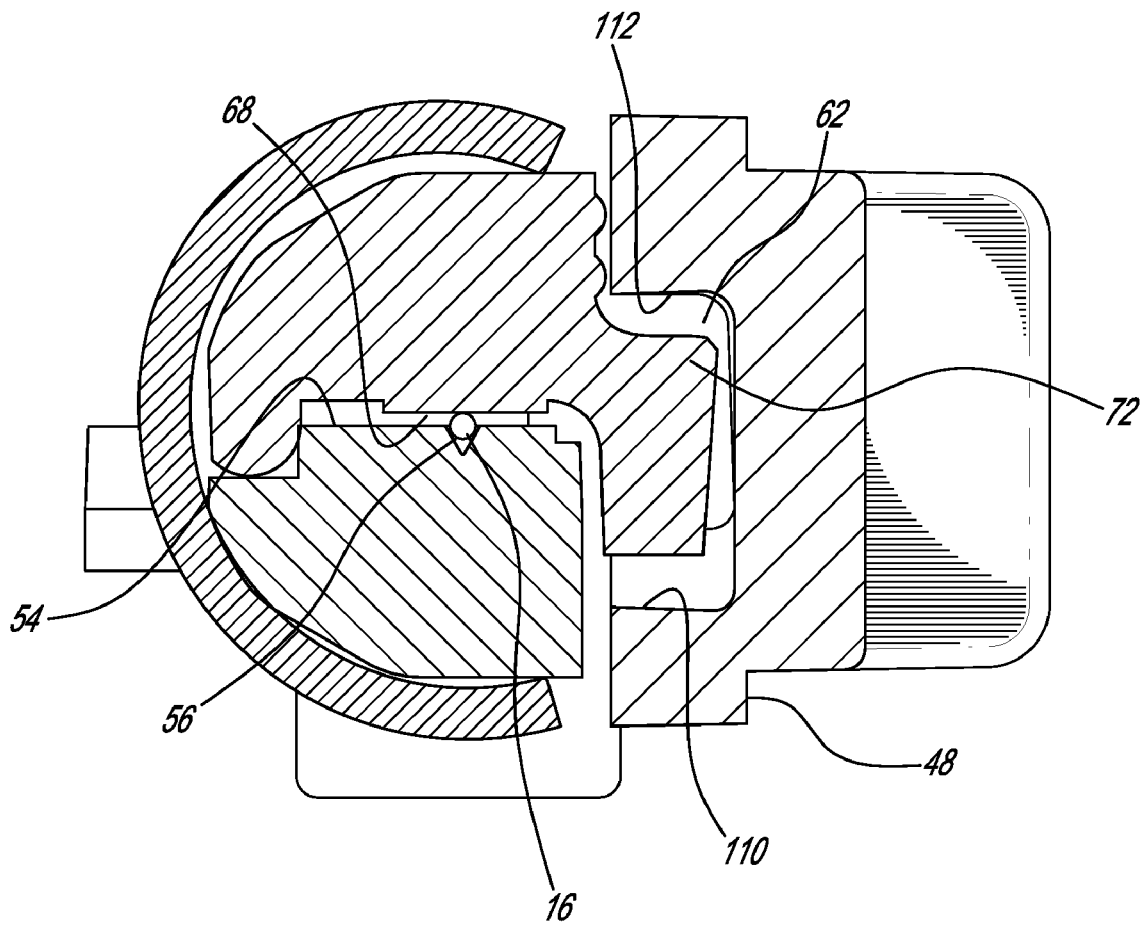
FIG. 9C is a sectional view along 9C-9C in FIG. 8.

Referring now to FIGS. 8, 9C, and 9D, as the sliding actuator 48 as moved into the closed positioned from the open position, the alignment bosses 72, 92 of respectively the splice anvil 42 and the buffer cladding anvil 44 move away from their respective raised surfaces 114, 116 and, under force of the C spring 46 are moved out of alignment with the alignment bosses 62 of the elongate member 38. As a result, the optic fiber clamping surface 68 and the buffer clamping surface 88 move towards the member surface 54. Provided a suitably prepared fiber optic cable 18 is positioned such that the cleaved end of the bare glass fiber 24 comes to rest against the cleaved end of the optical fiber stub 16, in the closed position, the splice anvil 42 will mechanically clamp the optical fiber stub 16 to the bare glass fiber 24 positioned in the V groove 56 and the buffer cladding 22 will be clamped mechanically between the buffer cladding anvil 44 and the elongate member 38.

As discussed above, between the open position and the closed positioned of the sliding actuator 48 is an intermediate position where the splice anvil 42 mechanically clamps the optical fiber stub 16 to the bare glass fiber 24 positioned in the V groove 56 (as illustrated in FIG. 9C) while a gap between the buffer clamping surface 88 and the member surface 54 is maintained (as in FIG. 9B). This has the advantage of ensuring that a good proximity is maintained between the optical fiber stub 16 and the cleaved end of fiber optic cable 18 during installation.

Note that although the sliding actuator is illustrated as moving from the opened position to the closed position, the connector of the present application can also be reversed, that is moved from the closed position to the opened position. In this regard, the C spring 46 provides additional resistance against moving the actuating assembly from the closed position to the opened position, thereby providing additional resistance against unwanted reversal of the connector/optical fiber once terminated. This is different from other connectors in the art, such as those with cam based actuators, where it is typically easier to move from the closed position to the open position. In view of this, additional means for locking the actuating mechanism in the closed position are unnecessary.

Referring back to FIG. 1, the termination mechanism of the present invention has the added advantage of being simple as well as non-destructively reusable. This is effected by returning the sliding actuator 48 from the closed clamping position to the original open released position. In this movement, the alignment bosses 62, 72, and 92 of respectively the elongate member, the splice anvil and the buffer cladding anvil are once again moved out of alignment. The optical fiber cable 18 may then be withdrawn from the connector 10 and subsequently reinserted for another attempt at a successful connection in the event where optical continuity between the fibers 16 and 20 has been deemed unacceptable. The connector 10 therefore eliminates the need for any extra and irreversible operation to crimp a lead-in tube or annular crimp ring or the like, as is the case in many conventional connectors. As the crimp is destructive, such crimping typically degrades the fiber interface and such degraded connection cannot be improved short of cutting away the wasted connector, re-stripping, re-cleaving, and re-terminating the optical fiber cable 18 with a new fiber stub 16 in a new connector 10. These problems are overcome by the connector of the present application.

One additional advantage of the invention of the present application is that, through the provision of translucent or transparent materials for the fabrication of the splice anvil 42 and the sliding actuator 48, a "built in" Visual Fault Locator (VFL) can be provided for in the connector. Indeed, with the sliding actuator 48 in the closed position, attempted transmission of light into the fiber stub 16 via the polished front end of the ferrule 14 (using an appropriate light emitting set up, not shown) using an incorrectly terminated fiber optic cable 18 will generally result in a readily visible glowing dot appearing on the sliding actuator 48 (due to light dispersion at the fiber stub 16/fiber optic cable 18 interface). On the other hand, a correctly terminated fiber optic cable 18 will not result in the dot appearing. This provides a quick and simple means for an installer to check whether or not the fiber optic cable has been correctly terminated. In the event that the fiber optic cable has not been correctly terminated, the installer can simply reverse the connector by moving the sliding actuator 48 to the open position and trying again.

In addition and still referring to FIG. 1, the assembly of the present invention is advantageously adaptable to various types of fiber connectors, such as fiber connectors conformed to the Straight Tip (ST), Standard Connector (SC), or hybrid fiber and electrical contact standards. Moreover, the use of two (2) anvils as in 42 and 44 enables to more accurately control the termination of the optical fiber 18 as pressure can be applied (in the closed position) on both the buffered portion 22 (by the buffer cladding anvil 44) as well as on the mating region (by the splice anvil 42), thus better aligning and retaining the fibers 16 and 24 within the connector 10.

Although the present invention has been described hereinabove by way of specific embodiments thereof, it can be modified, without departing from the spirit and nature of the subject invention as defined in the appended claims.

What is claimed is:

1. A connector for reversibly terminating a cable comprising a buffer cladding surrounding an optical fiber wherein an end portion of the cable is exposed to reveal the optical fiber and an optical fiber splicing face, the connector comprising:

a fiber splice comprising a first pair of opposed surfaces and an alignment groove extending at least partially along one of said opposed surfaces and a source of elastic force for biasing said first pair of opposed surfaces together, wherein the exposed optical fiber is positioned within said groove;

a ferrule comprising a front face, an axial bore aligned with said groove and an optical fiber stub disposed in said bore and extending from said front face into said groove such that a stub splicing face of said optical fiber stub is positioned opposite the optical fiber splicing face of the optical fiber; and an integrated actuating assembly comprising a sliding actuator configured for sliding along a substantially straight path substantially in parallel to said groove between a first position wherein said assembly releases said elastic force and places said first pair of opposed surfaces in a closed position and the exposed optic fiber and said optical fiber stub are clamped in said groove by said pair of opposed surfaces and a second position wherein said assembly counters said elastic force and places said splice in an open position and the exposed optic fiber can be removed from said groove.

2. The connector assembly of claim 1, wherein said splice is mounted within a housing and said slide actuator can be actuated from outside said housing.

3. The connector assembly of claim 1, wherein said sliding actuator is closer to said ferrule in said first position than in said second position.

4. The connector assembly of claim 1, wherein said source of elastic force comprises a spring.

5. The connector assembly of claim 1, wherein said actuating assembly further comprises a pair of bosses, a first of said bosses attached to a long outer edge of a first one of said first pair of opposed surfaces and a second of said bosses attached to a long outer edge of a second one of said first pair of opposed surfaces, said first and second bosses moveable using said sliding actuator between a normally staggered position and an aligned position, wherein when said sliding actuator is in said second position, said pair of bosses are in said staggered position and the exposed optic fiber and said optical fiber stub are clamped in said groove between said first pair of opposed surfaces and when said sliding actuator is in said first position, said pair of bosses are in said aligned position and the exposed optic fiber can be removed from said groove.

6. The connector assembly of claim 1, further comprising a buffer clamp comprising a second pair of opposed surfaces positioned adjacent said first pair of opposed surfaces and wherein said sliding actuator is further configured for moving further away from said first position between said second position and a third position wherein the buffer cladding is clamped between said second pair of opposed surfaces.

7. A connector for reversibly terminating a cable comprising a buffer cladding surrounding an optical fiber wherein an end portion of the cable is exposed to reveal the optical fiber, the connector comprising:

an elongate member comprising a first end, a second end and an alignment groove extending at least partially along a member surface thereof between said first end and said second end, wherein the exposed optical fiber is positioned within said groove and extending from said second end;

a ferrule comprising a front face, a rear end positioned adjacent said first end, an axial bore aligned with said groove and an optical fiber stub disposed in said bore and extending from said front face into said groove such that a stub splicing face of said optical fiber stub is positioned opposite an optical fiber splicing face of the optical fiber;

a clamping assembly comprising a splice anvil comprising a fiber clamping surface positioned facing said member surface and overlapping said stub splicing face and said optical fiber splicing face;

a source of elastic force for biasing said fiber clamping surface towards said member surface; and an integrated actuating assembly comprising a sliding actuator configured for sliding along a path substantially in parallel to said groove between a first position wherein said assembly releases said elastic force such that the exposed optic fiber and said optical fiber stub are clamped in said groove between said fiber clamping surface and said member surface and a second position wherein said assembly counters said elastic force such that the exposed optic fiber can be freely removed from or inserted into the connector.

8. The connector assembly of claim 7, wherein said splice anvil and said slide are manufactured from a transparent or translucent material and at least a portion of said slide is in contact with a portion of said splice anvil.

9. The connector assembly of claim 7, wherein said source of elastic force comprises a spring.

10. The connector assembly of claim 7, wherein said actuating assembly further comprises a pair of bosses, a first of said bosses attached to a long edge of said splice anvil a second of said bosses attached to a long edge of said elongate member, said first and second bosses moveable using said sliding actuator between a normally staggered position and an aligned position, wherein when said sliding actuator is in said first position, said pair of bosses are in said staggered position and the exposed optic fiber and said optical fiber stub are clamped in said groove between said fiber clamping surface and said member surface and when said sliding actuator is in said second position, said pair of bosses are in said aligned position and the exposed optic fiber can be removed from said groove.

11. The connector assembly of claim 1, further comprising a buffer cladding anvil comprising a buffer cladding clamping surface positioned facing said member surface and wherein said sliding actuator is further configured for moving further away from said second position between said first position and a third position wherein the buffer cladding is clamped between said buffer cladding clamping surface and said member surface.

* * * * *